US011148616B2

(12) United States Patent
Lovasz et al.

(10) Patent No.: US 11,148,616 B2
(45) Date of Patent: Oct. 19, 2021

(54) METHOD AND APPARATUS FOR FASTENING HARD AND SOFT TOP APPLIQUES

(71) Applicant: Ford Global Technologies, LLC, Dearborn, MI (US)

(72) Inventors: Ronald Lovasz, Allen Park, MI (US); Sara James, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 16/670,119

(22) Filed: Oct. 31, 2019

(65) Prior Publication Data

US 2021/0129645 A1    May 6, 2021

(51) Int. Cl.
| | |
|---|---|
| B60R 13/04 | (2006.01) |
| B60J 7/10 | (2006.01) |
| B60J 7/185 | (2006.01) |
| B62D 65/06 | (2006.01) |
| B60R 13/00 | (2006.01) |
| B62D 25/04 | (2006.01) |

(52) U.S. Cl.
CPC .............. *B60R 13/04* (2013.01); *B60J 7/106* (2013.01); *B60J 7/1858* (2013.01); *B60R 13/005* (2013.01); *B62D 65/06* (2013.01); *B62D 25/04* (2013.01)

(58) Field of Classification Search
CPC ........ B60R 13/04; B60R 13/005; B62D 25/04
USPC .................................. 296/193.06, 39.1, 1.08
See application file for complete search history.

(56) References Cited

U.S. PATENT DOCUMENTS

| | | | |
|---|---|---|---|
| 6,409,256 B1 | 6/2002 | Page | |
| 9,636,982 B2 | 5/2017 | Senoo et al. | |
| 10,118,571 B2 | 11/2018 | Maliskey et al. | |
| 2007/0182191 A1* | 8/2007 | Wright | B60R 13/025 296/39.1 |

* cited by examiner

*Primary Examiner* — Dennis H Pedder
(74) *Attorney, Agent, or Firm* — David Coppiellie; Carlson, Gaskey & Olds, P.C.

(57) ABSTRACT

An apparatus and method according to an exemplary aspect of the present disclosure includes, among other things, providing a vehicle with a hard top option where a hard top can be attached to the vehicle, a soft top option where a soft top can be attached to the vehicle, and a dual top option where either the hard top or the soft top can be attached to the vehicle. A hard top applique is provided for the hard top and a soft top applique is provide for the soft top, and a common set of fasteners is used to attach the hard top applique and the soft top applique to a pillar as needed to attach the hard top or soft top to the vehicle.

19 Claims, 3 Drawing Sheets

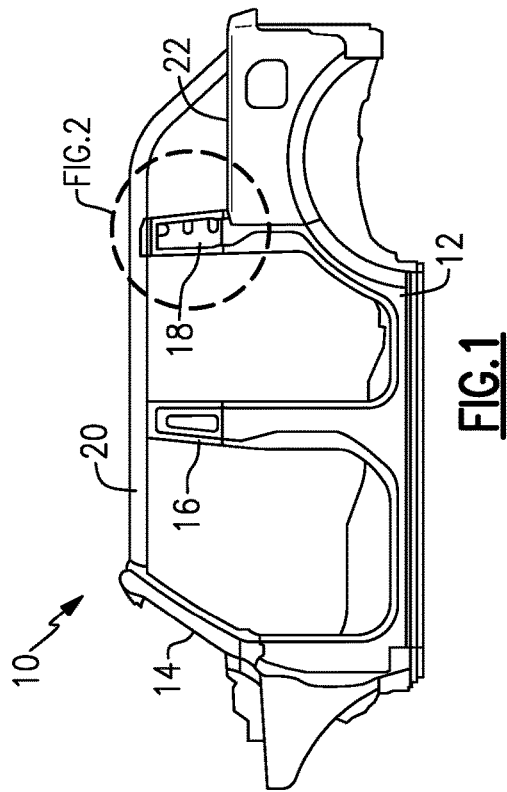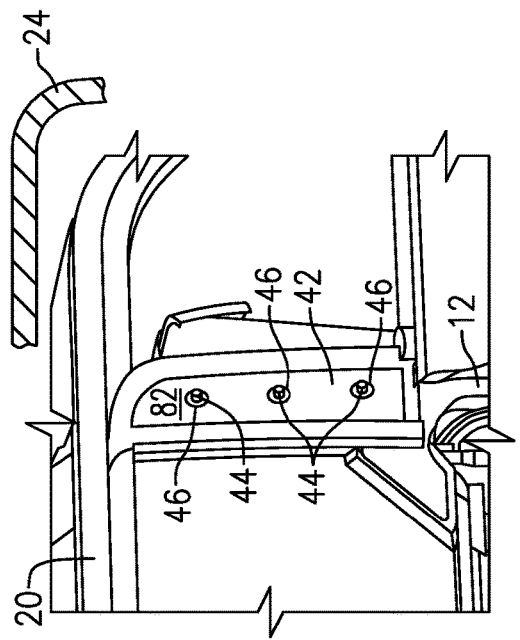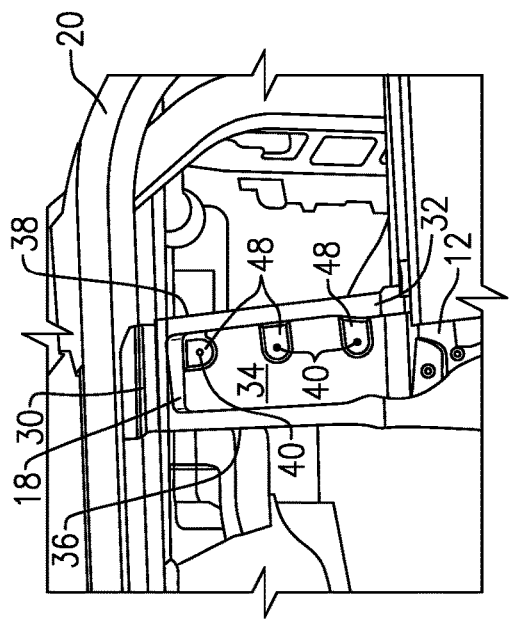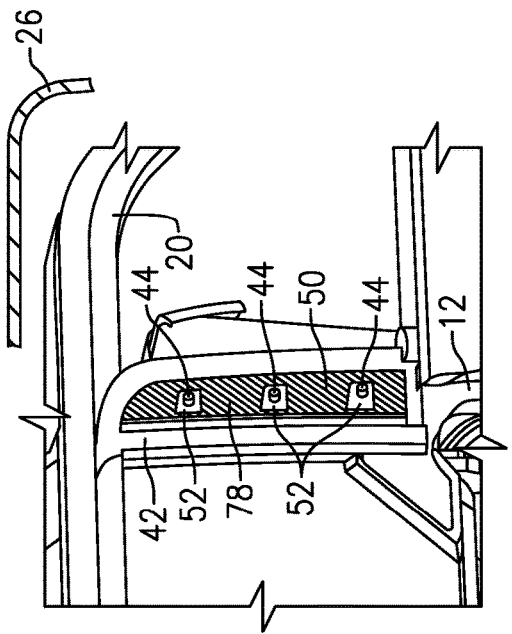

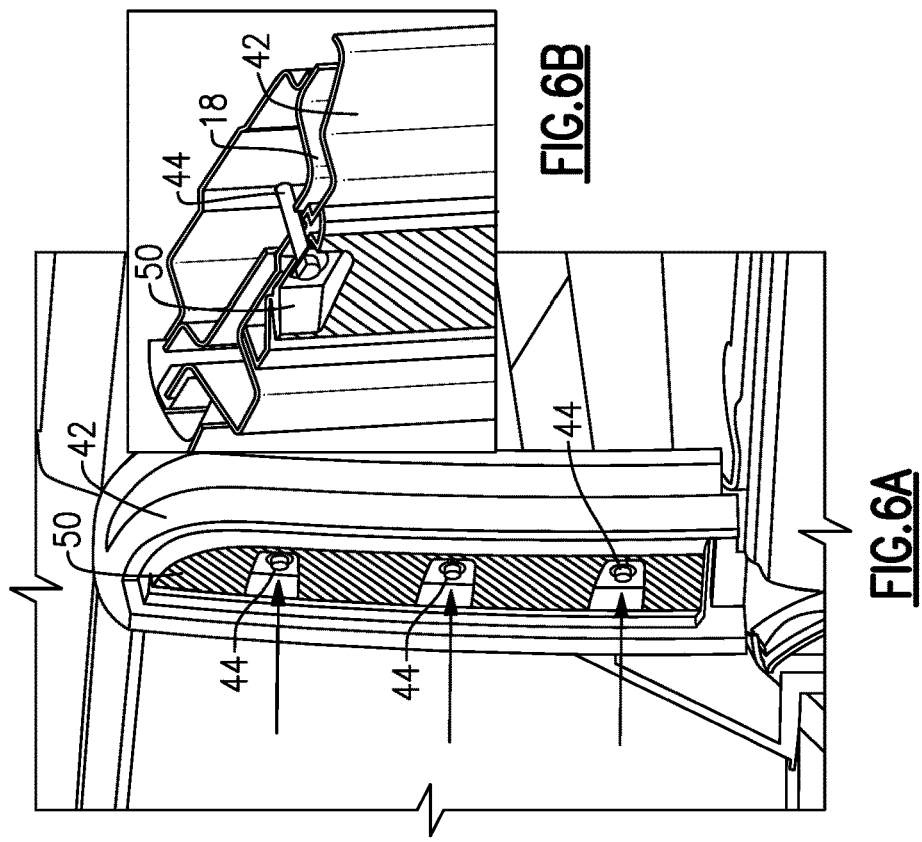
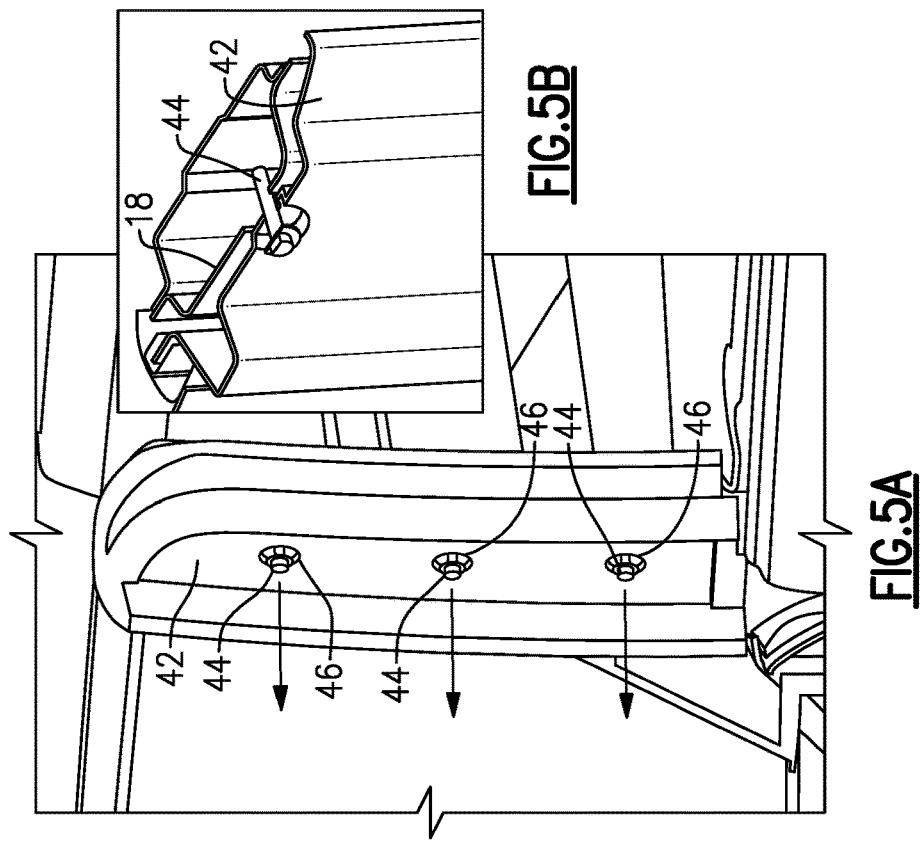

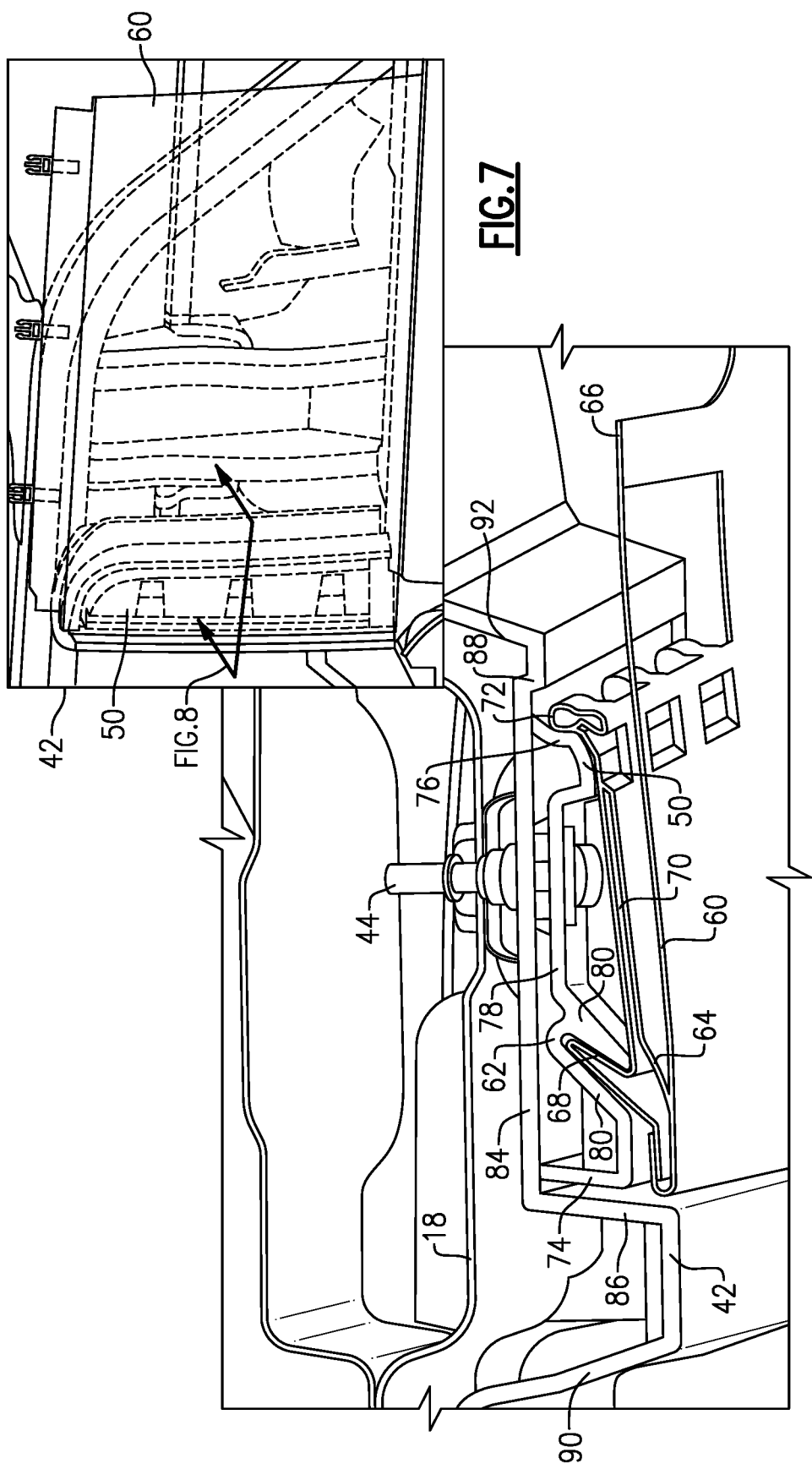

METHOD AND APPARATUS FOR FASTENING HARD AND SOFT TOP APPLIQUES

TECHNICAL FIELD

This disclosure relates generally to a method and apparatus for fastening hard and soft top appliques that uses a common fastening feature.

BACKGROUND

Vehicles can offer hard top and soft top configurations. To facilitate attachment of the hard and soft tops to the vehicle, an applique is mounted to a pillar. In addition, soft top configurations need to allow for retention of a soft top quarter panel window assembly to the pillar. The fastening technique for switching between the different configurations should be simple and effective.

SUMMARY

A method according to an exemplary aspect of the present disclosure includes, among other things, attaching a first applique to a pillar with at least one fastener to provide a first top configuration, positioning a second applique to cover at least a portion of an external surface of the first applique to provide a second top configuration, and attaching the second applique to the first applique with the at least one fastener such that the first applique remains attached to the pillar for both the first and second top configurations.

In a further non-limiting embodiment of the foregoing method, the at least one fastener comprises a plurality of fasteners.

In a further non-limiting embodiment of any of the foregoing methods, the method includes removing the plurality of fasteners, removing the second applique, and re-installing the plurality of fasteners to provide the first top configuration.

In a further non-limiting embodiment of any of the foregoing methods, the method includes removing the plurality of fasteners, positioning the second applique over the first applique, and re-installing the plurality of fasteners to provide the second top configuration.

In a further non-limiting embodiment of any of the foregoing methods, the first top configuration comprises a hard top and the second top configuration comprises a soft top.

In a further non-limiting embodiment of any of the foregoing methods, the second applique includes at least one mount interface for a soft top quarter panel window, and the method includes installing a mount portion of the soft top quarter panel window in the at least one mount interface to retain the soft top quarter panel window to the pillar.

In a further non-limiting embodiment of any of the foregoing methods, the method includes forming a first plurality of openings in the first applique, forming a second plurality of openings in the second applique, aligning the second plurality of openings with the first plurality of openings to provide an aligned set of openings, and inserting one fastener from the plurality of fasteners into each aligned opening from the aligned set of openings to provide the second top configuration.

In a further non-limiting embodiment of any of the foregoing methods, the method includes axially spacing the plurality of openings apart from each other along a length of the pillar.

A method according to still another exemplary aspect of the present disclosure includes, among other things, providing a vehicle with a hard top option where a hard top can be attached to the vehicle, a soft top option where a soft top can be attached to the vehicle, and a dual top option where either the hard top or the soft top can be attached to the vehicle. The method further includes providing a hard top applique for the hard top and a soft top applique for the soft top, and using a common set of fasteners to attach the hard top applique and the soft top applique to a pillar as needed to attach the hard top or soft top to the vehicle.

In a further non-limiting embodiment of any of the foregoing methods, the method includes attaching the hard top applique to the pillar with the common set of fasteners to attach the hard top to the vehicle, and wherein the soft top applique is not attached to the pillar when the hard top is attached to the vehicle.

In a further non-limiting embodiment of any of the foregoing methods, the method includes removing the common set of fasteners, positioning the soft top applique over the hard top applique, and re-installing the common set of fasteners to secure the soft top applique to the pillar for attachment of the soft top to the vehicle.

In a further non-limiting embodiment of any of the foregoing methods, the method includes removing the plurality of fasteners, removing the soft top applique, and re-installing the plurality of fasteners to secure the hard top applique to the pillar for attachment of the hard top to the vehicle.

In a further non-limiting embodiment of any of the foregoing methods, the hard top applique remains attached to the pillar for each of the soft top, hard top, and dual top options.

An apparatus, according to yet another exemplary aspect of the present disclosure includes, among other things, a pillar, a first applique attached to the pillar with at least one fastener to provide a first top configuration, and a second applique attached to cover at least a portion of the first applique to provide a second top configuration. The second applique is attached to the first applique with the at least one fastener such that the first applique remains attached to the pillar for both the first and second top configurations.

In a further non-limiting embodiment of the foregoing apparatus, the at least one fastener comprises a plurality of fasteners axially spaced apart from each other along a length of the pillar.

In a further non-limiting embodiment of any of the foregoing apparatus, the at least one fastener comprises a plurality of fasteners, and wherein the plurality fasteners fasten only the first applique to the pillar for the first top configuration, and wherein the plurality of fasteners fasten both the first and second appliques to the pillar for the second top configuration.

In a further non-limiting embodiment of any of the foregoing apparatus, the first top configuration comprises a hard top and the second top configuration comprises a soft top.

In a further non-limiting embodiment of any of the foregoing apparatus, the second applique includes at least one mount interface for a soft top quarter panel window, and wherein a mount portion of the soft top quarter panel window is installed in the at least one mount interface to retain the soft top quarter panel window to the pillar.

In a further non-limiting embodiment of any of the foregoing apparatus, the first applique includes a first plurality of openings and the second applique includes a second plurality of openings that are aligned with the first plurality of openings to provide an aligned set of openings, and wherein one fastener from the plurality of fasteners is inserted into each aligned opening from the aligned set of openings to provide the second top configuration.

In a further non-limiting embodiment of any of the foregoing apparatus, the first applique includes an external surface with a recessed area formed between at least two side walls, and wherein the second applique fits within the recessed area between the at least two side walls.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a side view of a vehicle that can have a hard or a soft top configuration.

FIG. 2 is an enlarged detail of an area as identified in FIG. 1.

FIG. 3 is similar to FIG. 2 but shows a hard top applique installed with a plurality of fasteners.

FIG. 4 is similar to FIG. 2 but shows a soft top applique installed over the hard top applique with the same plurality of fasteners.

FIG. 5A is a perspective view of FIG. 3.
FIG. 5B is a section view of FIG. 5A.
FIG. 6A is a perspective view of FIG. 4.
FIG. 6B is a section view of FIG. 6A.
FIG. 7 is a perspective view of FIG. 4 and shows a soft top quarter panel window installed on the soft top applique.
FIG. 8 is a section view of FIG. 7.

DETAILED DESCRIPTION

This disclosure details, among other things, an exemplary method and apparatus for fastening hard and soft top appliques that uses a common fastening feature. In one example, the common fastening feature comprises a plurality of fasteners that are used to provide both a hard top configuration and a soft top configuration.

FIG. 1 shows a vehicle 10 that is capable of having a hard top configuration (FIG. 3) and a soft top configuration (FIG. 4). The vehicle 10 includes a frame or body structure 12 that includes at least a forward pillar 14, a middle pillar 16, and a rear pillar 18. A top frame or rail 20 extends from the first pillar 14, along upper edges of the middle 16 and rear 18 pillars, and then bends down toward the body structure 12 along a cargo area 22. FIG. 1 shows a driver side of the vehicle 10, and it is understood that a similar set of pillars and a top rail would also be located on the passenger side of the of the vehicle 10. Open areas between the pillars 14, 16, 18 are window areas. A hard top 24 (FIG. 3) or a soft top 26 (FIG. 4) is secured to the vehicle 10 over the top rails 20 in a known manner.

FIG. 2 shows the pillar 18, which has an upper portion 30 held fixed to the top rail and a lower portion 32 held fixed to the body structure 12. In on example, the pillar 18 has an external surface 34 that extends between a front edge 36 and a rear edge 38, and between the upper 30 and lower 32 portions. One or more openings 40 are formed within the external surface 34. In one example, embossments 48 are formed around each opening 40.

FIG. 3 shows a first applique 42 that is attached to the pillar 18 with one or more fasteners 44 to provide a first top configuration. In this example, the first applique 42 is a hard top applique and the first top configuration is a hard top configuration where the hard top 24 is attached to the vehicle 10. In one example, the hard top applique 42 includes one or more openings 46 that are aligned with the openings 40 in the pillar 18. The fasteners 44 are inserted through the aligned openings 40, 46 to secure the hard top applique 42 to the pillar 18.

FIG. 4 shows a second applique 50 attached to cover at least a portion of the hard top applique 42 to provide a second top configuration. In this example, the second applique 50 is a soft top applique and the second top configuration is a soft top configuration where the soft top 26 is attached to the vehicle 10. In one example, the soft top applique 50 includes one or more openings 52, which are aligned with the openings 46 in the hard top applique 42, and are aligned with the openings 40 in the pillar 18. The soft top applique 50 is attached to the hard top applique 42 with the fasteners 44 such that the hard top applique 42 remains attached to the pillar 18 for both the hard and soft top configurations. Thus, the fasteners 44 fasten only the hard top applique 42 to the pillar 18 for the hard top configuration, and the fasteners 44 simultaneously fasten both the hard 42 and soft 50 appliques to the pillar 18 for the soft top configuration.

In one example, a plurality of fasteners 44 are axially spaced apart from each other along a length of the pillar 18 that extends in a direction from the upper portion 30 to the lower portion 32. In one example, the fasteners 44 are spaced inwardly of the front edge 36 and the rear edge 38 of the pillar 18 such that the fasteners 44 are in a central location along the pillar 18, as well as being in a central location along the hard 42 and soft 50 top appliques. In one example, three fasteners 44 are used, and the three fasteners 44 are spaced generally equally apart from each other along the pillar 18.

In one example, the method of assembling the appliques is as follows. The hard top applique 42 is initially installed to the pillar 18 with one or more small fasteners (not shown) such that the hard top applique 42 is retained to the vehicle 10 during initial install. Optionally, instead of small fasteners, other retaining techniques such press-fit or snap-fit, for example, could also be used. The fasteners 44 described above are used for the main retention of the appliques to the pillar 18.

The vehicle 10 can be configured as a hard top vehicle where the hard top 24 is installed on the vehicle 10, a soft top vehicle where the soft top 26 is installed on the vehicle 10, or the vehicle can be configured as a dual top option vehicle where the customer orders both the hard top and the soft top options. A common set of fasteners 44 is then used to attach the hard top applique 42 and the soft top applique 50 to the pillar 18 as needed to attach the hard top 24 or soft top 26 to the vehicle 10.

For a hard top vehicle, the hard top applique 42 is installed on the pillar 18 as described above, with the common fasteners 44 being used for the main retention of the hard top applique 42 to the pillar 18. When a soft top vehicle is manufactured, the hard top applique 42 is installed first and remains attached to the vehicle with the two small fasteners or other initial retention feature as described above. Next, the soft top applique 50 is installed on top of the hart top applique 42 and the common fasteners 44 are inserted through both appliques 42, 50 for the main retention of the appliques 42, 50 to the pillar 18. As such, the fasteners 44 retain both the hard top applique 42 and the soft top applique 50 to the pillar 18, which provides a rigid part to attach a soft top quarter window 60 (FIG. 7).

For a dual top vehicle option, the vehicle 10 is manufactured with the hard top applique 42 attached to the pillar 18, and with the fasteners 44 and the hard top 24 installed. When the customer wants to swap out the hard top 24 for the soft top 26, the hard top 24 is removed and then the fasteners 44 are removed as shown in FIGS. 5A-5B. The soft top applique 50 is then installed over the hard top applique 42 and the fasteners 44 are re-inserted through the appliques 42, 50 to secure the appliques 42, 50 to the pillar 50 as shown in FIGS. 6A-6B. The vehicle 10 is now ready for the soft top installation.

When the customer wants to swap the soft top 26 for the hard top 24, the soft top 26 is removed and the fasteners 44 are removed. The soft top applique 50 is then removed and the fasteners 44 are re-installed such that only the hard top applique 42 remains. The vehicle is then ready for the hard top installation.

FIG. 7 shows an example for the soft top configuration where the soft top quarter window 60 is fit to the soft top applique 50. As shown in FIG. 8, the soft top applique 50 includes at least one mount interface 62 for the soft top quarter panel window 60. A mount portion 64 of the soft top quarter panel window 60 is installed in the mount interface 62 to retain the soft top quarter panel window 60 to the pillar 18. In one example, the soft top quarter panel window 60 has a main window body 66 and the mount portion 64 is at a front edge of the main window body 66. In one example, the mount portion 64 includes a flange or protrusion 68 that extends outwardly from a rear of the main window body 66. An extension portion 70 extends rearwardly from the protrusion 68 and terminates at a distal retention lip 72.

In one example, the soft top applique 50 includes a forward flange 74 and a rear flange 76 with a body portion 78 extending therebetween. The body portion 78 includes the openings 52 for the fasteners 44. The mount interface 62 is formed within the body portion 78. In one example, the mount interface 62 comprises a groove, slot, or recess that is configured to receive the protrusion 68 of the soft top quarter panel window 60. The recess includes wall portions 80 that are separated by a gap that receives the protrusion 68.

In one example, the hard top applique 42 includes an external surface 82 (FIG. 3) with a recessed area 84 formed between a forward side wall 86 and a rear side wall 88. A front mount portion 90 fits over a forward edge of the pillar 18 and a rear mount portion 92 fits over a rear edge of the pillar 18. The openings 46 are formed within the recessed area 84 of the hard top applique 42. The soft top applique 50 fits within the recessed area 84 between the side walls 86, 88. The forward flange 74 of the soft top applique 50 faces the forward side wall 86 and the rear flange 76 faces the rear side wall 88. The distal retention lip 72 of the soft top quarter panel window 60 abuts directly against a rear facing surface of the rear flange 76 of the soft top applique 50 to further facilitate holding of the soft top quarter panel window 60 to the pillar 18 as shown in FIG. 8.

Using a common set of fasteners 44, as described above, provides a simplified and easy interchangeability for the hard top and the soft top configurations, as the customer uses the same fasteners for all configurations. This eliminates the chance of losing fasteners, as they are required to be installed for all configurations. Additionally, the provision of a separate soft top applique 50 allows for various styling options, customization, and possible advance lighting configurations.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method, comprising:
    attaching a first applique to a pillar with at least one fastener to provide a first top configuration;
    positioning a second applique to cover at least a portion of an external surface of the first applique to provide a second top configuration; and
    attaching the second applique to the first applique with the at least one fastener such that the first applique remains attached to the pillar for both the first and second top configurations.

2. The method according to claim 1, wherein the at least one fastener comprises a plurality of fasteners.

3. The method according to claim 2, including removing the plurality of fasteners, removing the second applique, and re-installing the plurality of fasteners to provide the first top configuration.

4. The method according to claim 3, including removing the plurality of fasteners, positioning the second applique over the first applique, and re-installing the plurality of fasteners to provide the second top configuration.

5. The method according to claim 4, wherein the first top configuration comprises a hard top and the second top configuration comprises a soft top.

6. The method according to claim 5, wherein the second applique includes at least one mount interface for a soft top quarter panel window, and including installing a mount portion of the soft top quarter panel window in the at least one mount interface to retain the soft top quarter panel window to the pillar.

7. The method according to claim 2, including forming a first plurality of openings in the first applique, forming a second plurality of openings in the second applique, aligning the second plurality of openings with the first plurality of openings to provide an aligned set of openings, and inserting one fastener from the plurality of fasteners into each aligned opening from the aligned set of openings to provide the second top configuration.

8. The method according to claim 2, including axially spacing the plurality of openings apart from each other along a length of the pillar.

9. An apparatus, comprising:
    a pillar;
    a first applique attached to the pillar with at least one fastener to provide a first top configuration; and
    a second applique attached to cover at least a portion of the first applique to provide a second top configuration, and wherein the second applique is attached to the first applique with the at least one fastener such that the first applique remains attached to the pillar for both the first and second top configurations.

10. The apparatus according to claim 9, wherein the at least one fastener comprises a plurality of fasteners axially spaced apart from each other along a length of the pillar.

11. The apparatus according to claim 9, wherein the at least one fastener comprises a plurality of fasteners, and wherein the plurality fasteners fasten only the first applique to the pillar for the first top configuration, and wherein the plurality of fasteners fasten both the first and second appliques to the pillar for the second top configuration.

12. The apparatus according to claim 11, wherein the first top configuration comprises a hard top and the second top configuration comprises a soft top.

13. The apparatus according to claim 12, wherein the second applique includes at least one mount interface for a soft top quarter panel window, and wherein a mount portion of the soft top quarter panel window is installed in the at least one mount interface to retain the soft top quarter panel window to the pillar.

14. The apparatus according to claim 11, wherein the first applique includes a first plurality of openings and the second applique includes a second plurality of openings that are aligned with the first plurality of openings to provide an aligned set of openings, and wherein one fastener from the plurality of fasteners is inserted into each aligned opening from the aligned set of openings to provide the second top configuration.

15. The apparatus according to claim 11, wherein the first applique includes an external surface with a recessed area formed between at least two side walls, and wherein the second applique fits within the recessed area between the at least two side walls.

16. The apparatus according to claim 9, wherein the first top configuration includes a selectively removable hard top and wherein the second top configuration includes a selectively removable soft top.

17. The apparatus according to claim 9, wherein the second applique includes at least one mount interface for a quarter panel window.

18. The method according to claim 1, wherein the first top configuration includes a selectively removable hard top and wherein the second top configuration includes a selectively removable soft top.

19. The method according to claim 1, wherein the second applique includes at least one mount interface for a quarter panel window.

* * * * *

UNITED STATES PATENT AND TRADEMARK OFFICE
CERTIFICATE OF CORRECTION

PATENT NO. : 11,148,616 B2  
APPLICATION NO. : 16/670119  
DATED : October 19, 2021  
INVENTOR(S) : Ronald Lovasz and Sara James Page 1 of 1

It is certified that error appears in the above-identified patent and that said Letters Patent is hereby corrected as shown below:

In the Claims

In Claim 8, Column 6, Line 58; replace "claim 2" with --claim 7--

In Claim 8, Column 6, Line 59; replace "the plurality of openings" with --the aligned set of openings--

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*